United States Patent [19] [11] 4,149,194
Holladay [45] Apr. 10, 1979

[54] VARIABLE ANGLE ELECTRONIC HALFTONE SCREENING

[75] Inventor: Thomas M. Holladay, Webster, N.Y.

[73] Assignee: Xerox Corporation, Stamford, Conn.

[21] Appl. No.: 813,599

[22] Filed: Jul. 7, 1977

[51] Int. Cl.² .......................... H04N 1/40; H04N 1/22
[52] U.S. Cl. ..................................... 358/283; 358/298
[58] Field of Search ............................... 358/283, 298

[56] References Cited
U.S. PATENT DOCUMENTS

| 3,961,132 | 6/1976 | Landsman | 358/283 |
| 4,032,978 | 6/1977 | Wong | 358/283 |
| 4,051,536 | 9/1977 | Roetling | 358/283 |

Primary Examiner—Howard W. Britton
Attorney, Agent, or Firm—Michael H. Shanahan

[57] ABSTRACT

An electronic signal representing the density of a scanned image is electronically halftoned by combining the pictorial signal with a rectangular array of halftone screen values to form an electronic halftone image. The electronic screen function represented by the array of halftone screen values is rotated at variable angles to the original electronic image by defining a repetitive rectangular matrix representative of any predetermined halftone cell approximating a parallelogram and incorporating a shifting parameter for the repetitive rectangular matrix. An efficient, high speed, partial-dot halftoning technique is performed by indexing the screen function rectangular array, under the supervision of the shifting parameter, against the scanned image values for a realtime serial combination of the functional values.

2 Claims, 7 Drawing Figures

VARIABLE ANGLE ELECTRONIC HALFTONE SCREENING

BACKGROUND OF THE INVENTION

This invention relates generally to image reproduction by electronic halftoning; and more particularly relates to such a system including a technique for producing halftone screens at variable angles with minimum memory requirements.

The process of reproducing a continuous toned image by a halftone representation is well known in the art. Generally, areas in the original continuous toned image are approximated by dots of differing sizes where the gradation in dot sizes of the reproduction is dependent on the gray scale level in the area of the original. For very low density values in the original, small dots are used and for darker areas, a larger dot size is provided. These areas of differing sizes of dots, when viewed from a distance, appear to represent a continuous tone image because of the integration by the human eye. Therefore, the dot area or halftone cells are necessarily small in order to create a continuous tone illusion.

Such halftoning processes typically utilize optical screening techniques to produce the halftone cells. A screen having opaque rulings separating transmissive halftone cells were normally added optically to an image in order to form a resulting halftoned image. The optical halftone screen adds or multiplies the image, cell by cell, by its transmittance function. The combined image is then thresholded onto an imaging member, such as a photographic film to produce the halftoned image having areas of differing dot size. The size and shape of the halftone cell forming the final image is dependent upon the screen used and differing optical effects that are apparent in the final image can be modified by choosing the screen carefully.

With the advent of video scanning and electronic representation of an image came the idea of electronic halftoning. If an image can be generated electronically as a video signal, then one should be able to generate an "electronic screen" or a signal representative of such to combine with the image signal. The combined signal, if thresholded against a reference similar to the photographic technique, would then be an electronic halftone image that could be outputted to a recording medium by a transducer. The electronic halftoning systems in the prior art have represented both analog techniques and digital procedures. However, the storage in combination of the screen functions in the previous systems have been generally inefficient and relatively expensive. With the resolution of a final image being dependent upon the number of pixels scanned, prohibitive amounts of time and memory have had to be used to provide a quality reproduced image. Furthermore, and particularly in the digital electronic halftoning area, prior techniques fail to teach a simplified method for generating an electronic halftone screen at non-orthogonal angles. With variable angle screens, it is possible to change the texture and final appearance of an image. Certain screen angles are more pleasing to the eye and combination screens at multiple angles can be used to create effects not presently available. Further, color reproductions usually require screens at various angles so that Moiré patterns are not seen in the final image.

In one prior technique of electronic halftoning, a simulation of the photographic process is achieved by individually turning on or off a large number of sub-cells from which is generated the electronic halftone cell or dot. A separate sample of the original image to be reproduced, a "pixel", is utilized in making a decision as to whether to turn on or off each sub-dot element, in the whole dot. In this method, there is combined typically be addition, a halftone screen function unrelated to original image intensity information with the electronic signal corresponding to the image information. This combined signal is then compared with a fixed threshold to determine how many partial dots within the halftone cell to turn on. Typically, levels above threshold are made white in the reproduction and levels below threshold are made black, although this is arbitrary and reverse may be true. Hence, the continuous tone original image becomes a binary image suitable for printing, display or viewing. In a digital implementation, signals for the screen and picture functions are sampled. Typically, there are twenty to thirty-two samples within the area corresponding to one period of the two dimensional screen function. Halftone dots of various sizes represent the gray levels.

Improvements over the usual technique are described by Klensch, R. J., "Electronically Generated Halftone Pictures", *RCA Review,* September, 1970 and Bayer, B.E., "An Optimum Method For Two-Level Rendition of Continuous-Tone Pictures", *IEEE International Conference On Communications,* Vol. 1, 1973.

The utilization of a rotated screen in other than a photographic system has previously been limited usually to zero degrees, or forty-five degrees. Forty-five degree screens are invariably based on patterns similar to those disclosed by B. E. Bayer, "An Optimum Method For Two-Level Rendition Of Continuous-Tone Pictures", *International Conference On Communications,* Conference Record, page 26–11 (1973) or B. Lipel and M. Kurland, "The Effects of Dither on Luminance Quantization Of Pictures", *IEEE Transactions On Communication Technology,* 6, page 879 (1971). A notable example can be found in C. N. Judice, et al, "Using Ordered Dither To Displace Continuous Tone Pictures On An AC Plasma Panel", *Proceeding Of The S.I.D.,* Vol. 15/4, Fourth Quarter, 1974.

Digital electronic halftoning employs, in general, horizontal and vertical screen angles. Examples of these are found in "XCRIBL — A Hard Copy Scan Line Graphics System For Document Generation", R. Reddy et al., *Information Processing Letters* (Netherlands), Vol. 1, No. 6, page 246 (1972). Analog systems have typically been limited to zero degree and/or forty-five degree screens. Typical analog systems are disclosed in R. J. Klensch et al., "Electronically Generated Halftone Pictures", Proceedings TAGA, page 302, 1970 and in R. L. Hallows et al., "Electronic Halftone", *IEEE Spectrum, page* 64, (October, 1968).

In new areas of technology it is often times desirable to provide improvements in systems which provide increased efficiency, greater capability and more variety than is presently obtainable. The present invention is such an improvement in that storage requirements for electronic half screening is reduced drastically; a great variety of halftone screen angles are permitted; and greater resolution is provided through the use of partial-dots of sub-dots within each halftone dot or cell.

SUMMARY OF THE INVENTION

It is, therefore, an object of the present invention to provide an apparatus and method useful in producing electronic halftone screens at various angles with respect to a scanned original image.

It is another object of the present invention to permit efficient storage of a halftone cell function used to generate screens at various angles.

Still another object of the invention is to provide an apparatus and method useful in producing electronic halftone screens at multiple angles.

A further object of the invention is to provide an apparatus and method useful in producing electronic halftone screens at non-perpendicular angles.

Yet, a still further object of the present invention is to provide an efficient method of electronically halftoning an image serially scanned in digital or analog applications.

The aforementioned objects and advantages, and others, are realized in accordance with the practice of the present invention by utilizing a repetitive rectangular matrix representative of a predetermined halftone cell approximating a parallelogram; incorporating a shifting parameter for the repetitive rectangular matrix; generating a pictorial signal representing the density of a continuous tone image and combining the pictorial signal with a signal representing the shifting, rectangular matrix of halftone screen values.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENTS

Figure 1A:
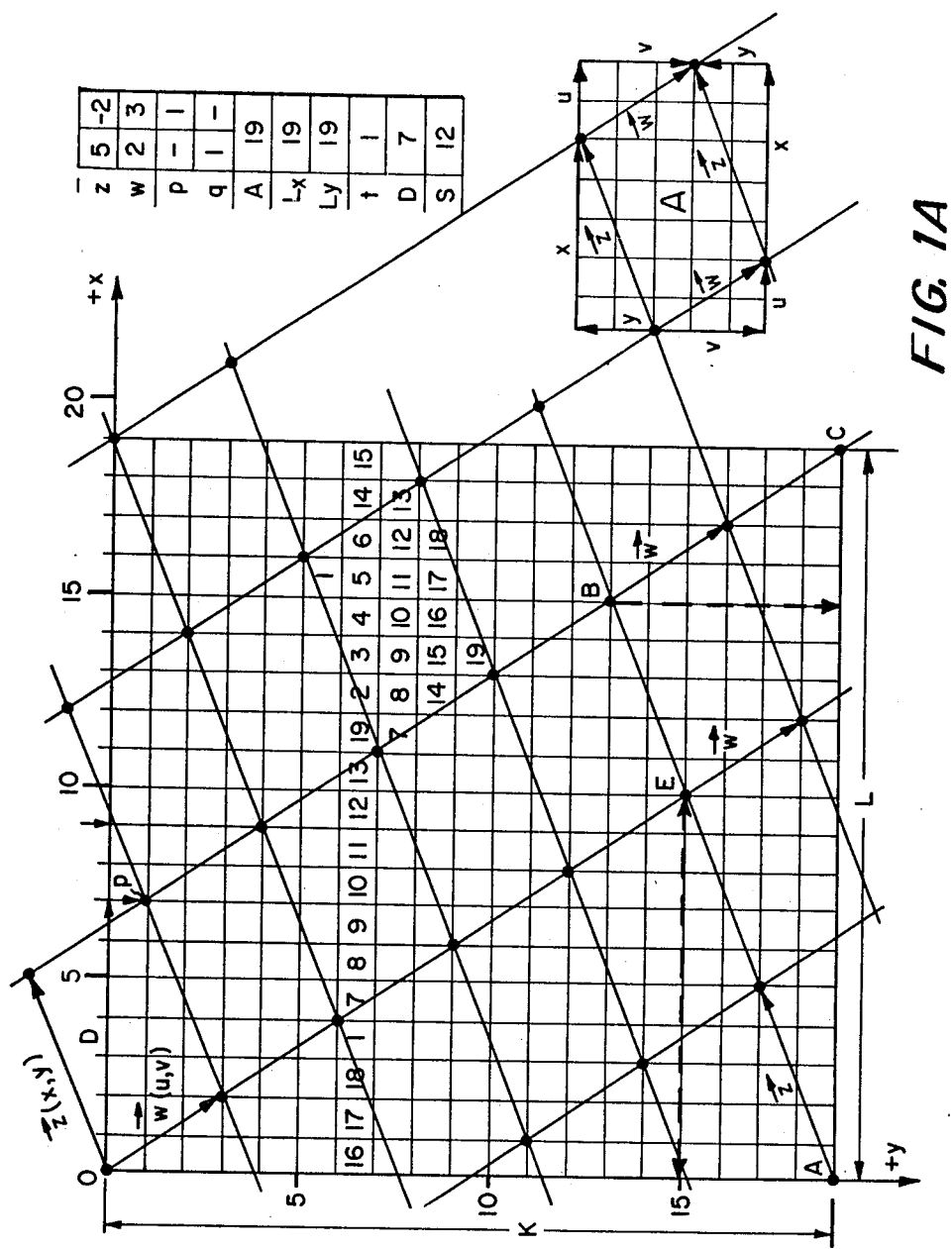
FIG. 1A–C are schematic illustrations of halftone screens comprising halftone cells, together with pertinent descriptors which define the halftone cells within the halftone screens.

Conversion of a Halftone Cell Approximating a Parallelogram Into a Rectangular Array To see how such an angled screen can be produced and how the pertinent descriptors are calculated, consider the creation of a halftone screen in the manner of FIG. 1A. The unit cell is visualized as a piece of a puzzle, where the pieces can be laid side by side to cover all space. In assembling these pieces it will be found that the area inside the cell will approximate the area of a parallelogram which is described by the two vectors $\vec{Z}=\vec{Z}(x,y)$ and $\vec{W}=\vec{W}(u,v)$. For convenience, FIG. 1A has a left-handed coordinate system with the origin in the top left corner. This corresponds to the general positioning of most output images. Positive "x" is horizontal and to the right and positive "y" is vertical and down.

An individual halftone cell is considered to be composed of a number of subelements which can be individually blackened to produce one of the shades of grey from none to all black. In FIG. 1A, the halftone cell is outlined above the point B and has 19 subelements for a total of 20 different possible grey levels represented by this halftone dot. The subelements are numbered 1 through 19.

At the right of FIG. 1A, a parallelogram with the area of the halftone cell (A) is inscribed in a rectangle in which the corresponding X and Y components of the two vectors $\vec{Z}=\vec{Z}(x,y)$, and $\vec{W}=\vec{W}(u,v)$ are shown. The area of the halftone cell (A) is the magnitude of the cross product of the two vectors Z and W in which the components of the vectors, x,y,u, and v are signed quantities. For the coordinate system shown in FIG. 1A all of the components of $\vec{Z}$ and $\vec{W}$ except y are positive. The area inside one halftone cell is thus easily shown with this coordinate system chosen to be $$A = x*v - u*y \quad (*, \text{a symbol for multiplication}) \qquad \text{Eq. 1}$$

This will be seen to be the sum of the product of the x component of the $\vec{Z}$ vector with the y component of the $\vec{W}$ vector and the corresponding reverses. This is valid because the y component of the $\vec{Z}$ vector as drawn will be negative.

Such a set of vectors will repeat along the X axis. If L is the distance along the X axis in which this parallelogram will recur, then clearly from triangle ABC in FIG. 1, this condition is satisfied when $$k \cdot \vec{Z} + j \cdot \vec{W} = L \qquad \text{Eq. 2}$$

Where k, j $\geq$ 0 are the smallest integer values to be solved to satisfy the equation. The vector Eq. 2 can be separated into two equations along the two coordinate axis to give In X direction:

$$k*x + j*u = L \qquad \text{Eq. 3}$$

In Y direction:

$$-k*y = j*v \qquad \text{Eq. 4}$$

If p is defined as the greatest common divisor (regardless of sign) of the two components y and v then Eq. 4 can be rewritten as $$-y/j = v/k = p = GCD(y,v) \geq 1 \qquad \text{Eq. 5}$$

Combining Eq. 5 with Eq. 3 and using the definition of Area from Eq. 1 gives $$A = L*p \qquad \text{Eq. 6}$$

Since A and p can be calculated from the components of the vectors for Z and W this means L can be calculated. A similar set of conditions can be obtained to find the repeat length in the $\vec{Y}$ axis, $\vec{K}$. In triangle AEO we must have $$m \cdot \vec{W} - n \cdot \vec{Z} = \vec{K} \qquad \text{Eq. 7}$$

where m,n>0 are integers which satisfy the equation and as before Eq. 7 can be separated into X and Y components to yield $$m*v + n*y = K \qquad \text{Eq. 8}$$

$$m*u = n*x \qquad \text{Eq. 9}$$

If an integer q is defined as the largest common divisor of the X components of the Z and W vectors which create the halftone cell, then Eq. 9 can be written as $$u/n = x/m = q = GCD(x,u) \geq 1 \qquad \text{Eq. 10}$$

Combining Eq. 10 with Eq. 8 and using the definition of the area of the unit cell, A, from Eq. 1, gives $$A = K*q \qquad \text{Eq. 11}$$

and again K can be obtained because A and q can be calculated from the components of the $\vec{Z}$ and $\vec{W}$ vectors which characterize the unit halftone cell.

One interpretation of Eqs. 6 and 11 is that a number of the original halftone cells, each approximating a parallelogram, can be combined to form a large rectangular block of many halftone cells of dimension L by K which will cover all spaces if laid end-to-end.

This is precisely the type of representation required for fast indexing purposes for serial halftoning techniques.

A closer look at Eq. 6 moreover, shows that the total area (A) involved in a parallelogram (i.e. a halftone cell) is consumed in a rectangle L by p. Because p will not, in general, equal K (see Eq. 11) the area must be repeated again for a number of times until the areas cover the space inside the L by K rectangle. Thus, the area must repeat itself again in a distance p in the y direction but must be displaced from the origin by a distance D such that the halftone cell which was at the origin at starting has moved to the next location in the +y direction. The number of displacements to cover the L by K rectangle are clearly the number of intersection points inside the L by K rectangle when it is recalled that the four corners are each only one-quarter inside the whole cell. It is obvious from Eqs. 6 and 11 that the number of repetitions in the y direction is the GCD (L,K), i.e. $L = p * GCD (L,K)$. From a graphical view point (see FIG. 1) the movement from the same position in one halftone cell to the next cell, can be accomplished by following along either the sides of the halftone cells (i.e. integer multiples of $\vec{Z}$ and $\vec{W}$) or in a horizontal (i.e. D) and vertical (i.e. p) directions. Since the distance between halftone cells is the same in both of these paths their vector sums are equal.

Mathematically, this repeat distance is satisfied if (see FIG. 1)

$$\vec{D} + \vec{p} = r*\vec{W} + t*\vec{Z} \qquad \text{Eq. 12}$$

where r, t $\geq 0$ are integers to be determined and a constraint exists on the value of D.

$$0 < |D| \leq L \qquad \text{Eq. 13}$$

writing the X and Y components of Eq. 12 gives $$r*u + t*x = D \qquad \text{Eq. 14}$$

$$r*v + t*y = p \qquad \text{Eq. 15}$$

Eqs. 13-15 are a set of three equations for determining r,t,D.

Eqs. 14-15 are a set of simultaneous equations which can be solved for the integers r and t to yield $$r = (p*x - D*y)/A \qquad \text{Eq. 16}$$

$$t = (D*v - u*p)/A \qquad \text{Eq. 17}$$

Solving Eq. 17 for D gives $$D = (t*A + p*u)/v \qquad \text{Eq. 18}$$

$0 < D \leq L$.

In Eq. 18, t $\geq 0$ is an integer which must be determined so that D satisfies Eq. 13. The other parameters are known quantities. Successive displacements of the amount D in the X direction and p in the Y direction will translate the original subelement of the halftone cell to the next corresponding position in the +Y direction. The parameter D is thus chosen from Eq. 18 to provide the correct angles on the halftone screen.

The Shifting Parameter

For indexing purposes and because of the coordinate axis chosen, it is convenient to define a shifting parameter S defined by $$S = L - D \qquad \text{Eq. 19}$$

Defining The Rectangular Matrix By Three Parameters

Thus the required halftone cells can be replicated at any angle by knowing three parameters, such as L, p, and S. It is most convenient to use three parameters NLEV, p, and S. NLEV and p respectively correspond to the total number of partial dots in the halftone cell and the number of lines in the basic cell each of length L. The shifting parameter, S, gives the starting address of the next element block a distance p in the +Y direction, which will create the rectangular repeat block L * K.

Starting with a rectangular array of numbers representing the total area of an arbitrary halftone cell, L, along the X axis and p along the Y axis, a whole halftone screen can be generated by indexing first in X and then in Y through this rectangular array of dimension A. If the indices go outside the cell in indexing in the X direction a circular buffer back to the same row (i.e., subtract L from the index) can be used. If the indices go outside the rectangular cell in the Y direction (i.e. larger than multiples of p) the shifting parameter can be added to the X address, which in a circular buffer mode, returns to the first line of the rectangular array.

For clarification this technique will be applied to a few representative cases. Consider FIG. 1A and examine the column of parameters on the right which describe the particular halftone dot under consideration. The dot is characterized by the two vectors $\vec{Z} = (5,-2)$ and $\vec{W} = (2,3)$. The greatest common divisor of the Y and X components of these two vectors give respectively $p = 1$, $q = 1$, from Eqs. 5 and 10. The total area of the halftone cell from Eq. 1 is clearly $A = (5) * (3) - (2) * (-2) = 19$ and from Eqs. 6 and 11, $L=K=19$. From Eq. 18 it is easy to show that $t=1$ and $D=7$ and thus from Eq. 19 the shifting parameter $S=19-7=12$.

With an array of numbers 19 values along the halftone screen with the desired angles depicted in FIG. 1 can be generated by creating the next row of values down in Y (i.e. $p=1$, in a +Y direction) by sliding the previous line circularly in a negative direction a distance of $S=12$.

Such an analysis yields interesting results when $\vec{Z}$ and $\vec{W}$ form a square with an included angle of 90 degrees. We have for the case of these rotated squares, the following: If $\vec{Z} = \vec{Z}(N,-M)$ then $\vec{W} = \vec{W}(M,N)$ and $p = q$; $A = N*N+M*M$; and $L=K$. For example, if $Z=Z(6,-2)$ then $p=q=2$, $A=6*6+2*2=40$ and $L=K=20$ which yields $t = 2$, $D = 14$ and $S = 6$.

It should be obvious from this analysis that the rectangular array L by K can also be indexed in the Y direction with corresponding shift parameters which can be calculated in a similar manner to the X indexing method described above. Moreover, a reflection of the basic rectangular cell about the y axis and the use of the parameter $D=L-S$ as a shift parameter will reflect the screen angles about the y axis. Thus, this reflection creates an angle screen at 90 degrees minus the original halftone screen.

Since the shift parameter is obviously associated with the angle of the halftone screen in the $\vec{W}$ direction a shift parameter, S', other than that calculated by the above analysis will yield a different angular separation between the $\vec{Z}$ and $\vec{W}$ vectors and hence non-perpendicular screen angles could result.

In addition, with correct shaping of the subelements of the halftone dot and a proper choice of a shift parameter it is possible to obtain multiple halftone screen angles.

Figure 1B:
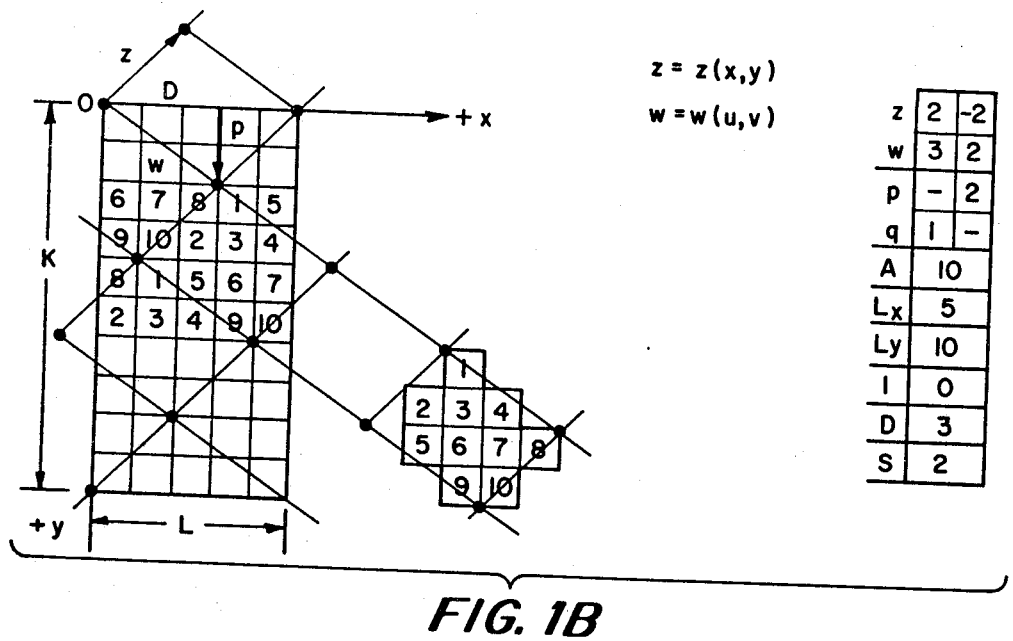
Figure 1C:
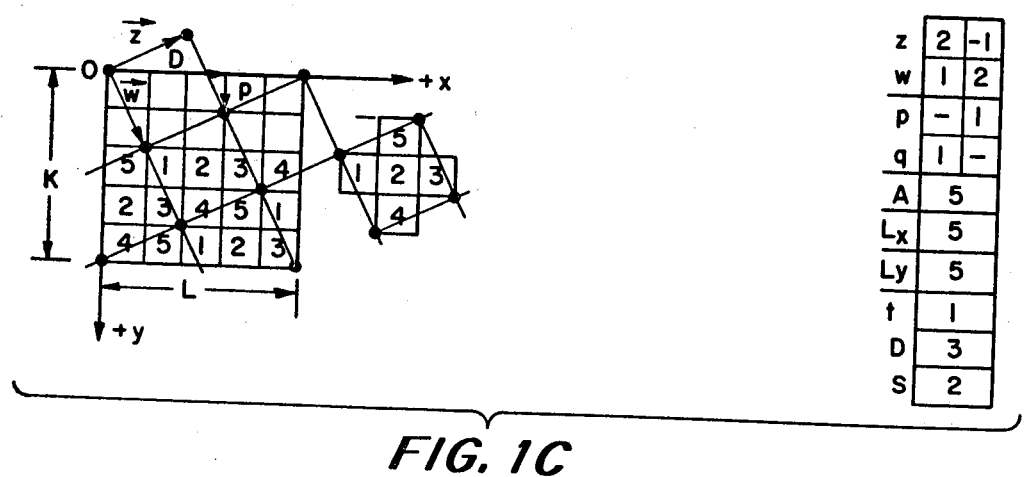

A similar analysis holds for the two patterns shown in FIGS. 1B and 1C. FIG. 1B is created from a pattern of 10 numbers ($A=10$) arranged 5 each ($L=5$) in 2 rows ($p=2$) where succeeding blocks of 2 down in Y are obtained by shifting the previous two lines in a negative direction by 2, (i.e. $S=2$). FIG. 1C is a similar chart for a square halftone cell which consists of 5 subelements in the halftone dot. This square halftone dot is tilted to give a screen angle of 26.6 degrees.

DESCRIPTION OF HALFTONE SCREEN ELEMENTS

Each of the halftone screen functions depicted in FIGS. 1A–C indicate that a halftone cell or halftone dot approximating a parallelogram in shape can be represented by a rectangular array of subelements or partial dots which are appropriately shifted during replication of the rectangular array in generating the whole electronic screen function. For the purposes of clarity of description, the halftone dots are herein referred to as halftone cells in order to avoid confusion with the subelements of the halftone dots which are herein referred to as partial dots. For the sake of convenience, in referring to FIG. 1B, the halftone cell shown to the right of the K*L block is shown to consist of ten partial dots. The numbers 1-10 refer to positions of the partial dots within the halftone cell. In the halftone reproduction of the original image to be copied, each of the partial dot positions numbered 1-10 is either occupied by marking material, such as ink, or left blank depending upon the density of the original image at a location thereon corresponding to the location of the partial dot position within the halftone cell.

In this regard, the present invention provides greater resolution and greater detail in the halftone reproduction than prior techniques. In prior techniques, an average gray scale value of a portion of the original image to be reproduced which corresponds to the halftone dot position on the halftone reproduction is obtained and thresholded against all of the halftone partial dots so as to cause the halftone dot area of the halftone reproduction to be either occupied by marking material or left blank. It is apparent that in prior techniques, the resolution and sensitivity to detail in the original image is quite attenuated.

In accordance with the present invention, with ten partial dot positions within the halftone cell, the original document intensity range detectable by the read scanner can be divided into ten ranges, each of which can be allocated to a partial dot position in the halftone cell. For example, if the read scanner provides a digital output of eight bits per pixel of original document, than there will be 256 intensity values detectable by the read scanner and which can be allocated to the partial dot positions in the halftone cell. For the ten partial dots in halftone cell of FIG. 1B, each partial dot is separated from the previous one by 25 intensity levels. The partial dot intensity value allocation can then be compared with the intensity value of the scanned original document pixel and appropriate circuitry provided to either cause occupation of the partial dot position with marking material or cause the partial dot position to be left blank.

By storing and utilizing a halftone screen function in a rectangular matrix together with a shifting parameter, the present invention provides another great advantage over prior techniques which attempt to provide partial dot halftone cells. These prior techniques, generally speaking, must store original document intensity value allocations for each partial dot value for each halftone cell together with information on the position of each cell. This requires a vast amount of data storage and handling, resulting in the consumption of time. On the other hand, the present invention, with its rectangular array of partial dot values consumes much less time in that in the rectangular array the partial dots are arranged in serial order. The only time delay is encountered in the present invention is that required for shifting during replication of the rectangular array.

In this connection, it is to be understood that the K*L blocks in FIGS. 1A–1C do not represent the whole screen function, but rather represent a basic block containing the minimum repeats in the x and y directions. A whole screen function contains a plurality of identical K*L blocks. This point should be kept in mind in order to appreciate the elegant simplicity of the present invention. Referring again to FIG. 1B, the rectangular array of partial dots is shown in the third and fourth lines of the K*L block. The first line has partial dots 6, 7, 8, 1, and 5; the second line in the array having partial dots 9, 10, 2, 3 and 4. Thus, within the third and fourth lines of FIG. 1B, all ten partial dot positions are arranged as indicated. The fifth line which includes partial dots 8, 1, 5, 6 and 7, is actually a replication of the first line with a shift of two partial dots. That is, the fifth line does not start with partial dots 6 and 7 but rather begins with partial dot 8 and includes partial dots 6 and 7, serially, after the serial inclusion of the sequence in the third line of partial dots 8, 1 and 5. Similarly, the sixth line is a replication of the fourth line with a similar two partial dot shift.

Generally speaking, in scanning an original document and outputting a reproduction, it is conventional to scan across the entire width of the original and reproduced documents before indexing down to the next line. Accordingly, it will be appreciated that the partial dot position in the third line continue in the indicated sequence until the terminal margin has been reached. Then, the next line of the rectangular array of partial dots is outputted repetitively until the terminal margin is reached. It will be appreciated that in FIG. 1B, since there are two lines in the rectangular array ($p=2$) that there is an alternation in the outputting of these lines across the width of the halftone reproduction. On the other hand, $p=1$ in FIGS. 1A and 1C indicating that the rectangular array of partial dots comprises a single line. Thus, in these two cases, there is no alternation. The single line, rectangular array of partial dots can be circularly buffered continuously across the width of the output scan until the terminal margin is reached. At this point, the shifting parameter indexes the rectangular array by the appropriate amount. Thus, the output scanner can literally zip across the width of the halftone reproduction without time delays inherent in prior techniques. By conversion of angular screens into rectangular screens, the rectangular screen function provides an ease of indexing with a concurrent reduction in the amount of information needed to be stored and manipulated. This provides orders of magnitude improvement over prior techniques which store a whole electronic halftone screen function or an output buffer, and compare the image pixel by pixel to each of the halftone cells or even partial dots of the stored halftone screen function.

DESCRIPTION OF LOGIC CONTROL AND COMPLETE REPRODUCTION SYSTEM

Figure 2:
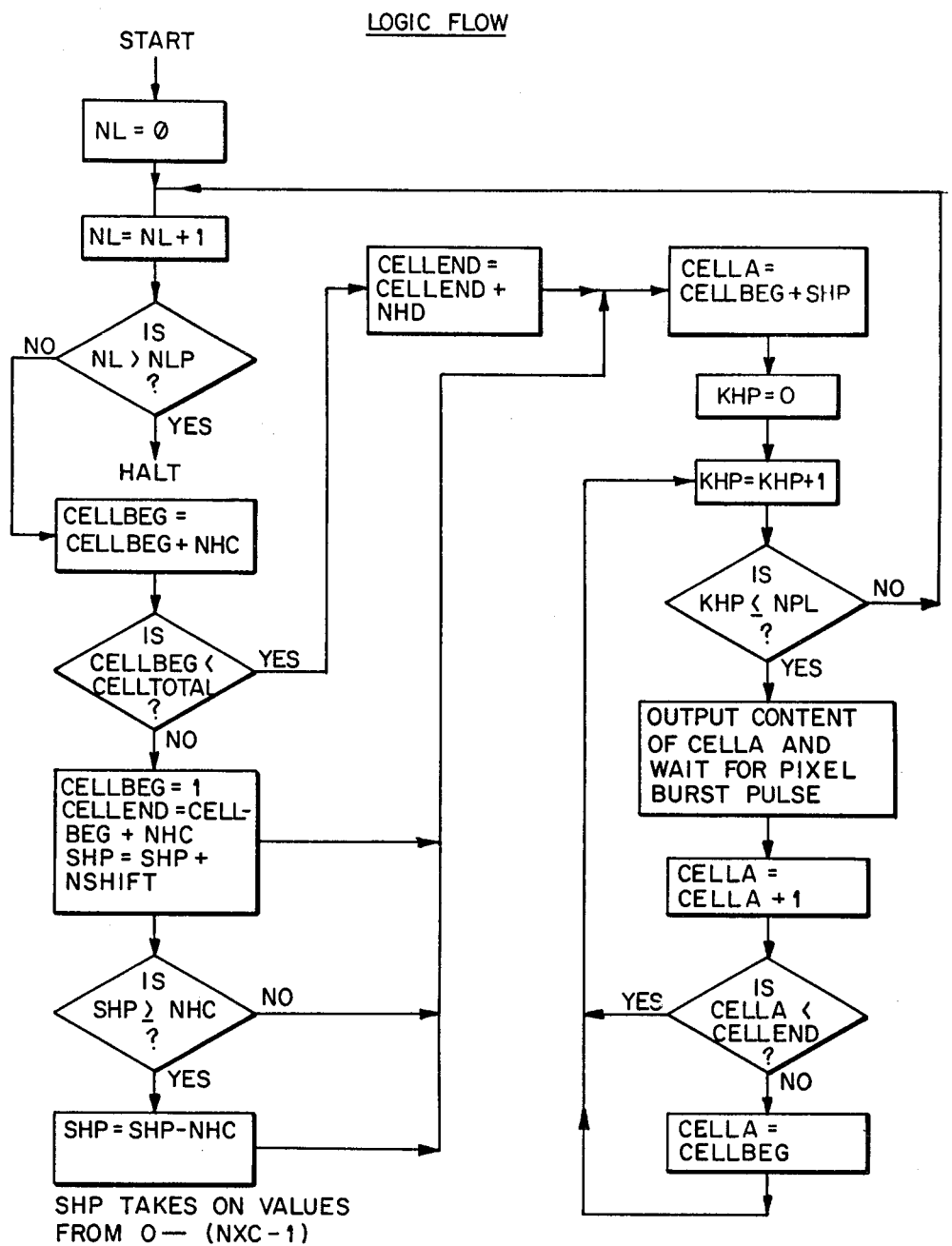
FIG. 2 is a schematic flow chart of logic suitable for use in the practice of the present invention.
Figure 3:
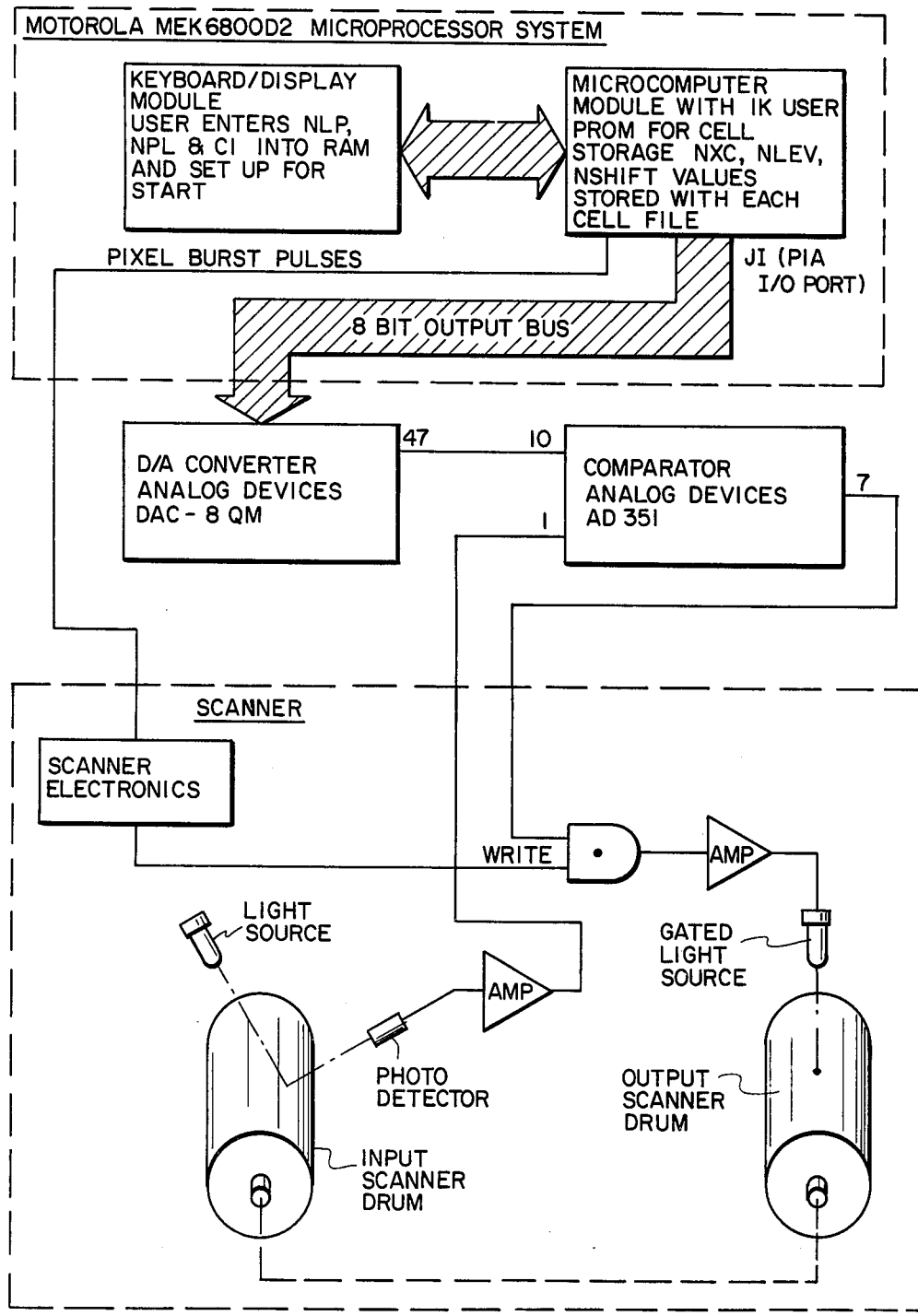
FIG. 3 is a schematic illustration of circuitry employed to provide the overall halftone reproduction system.
Figure 5:
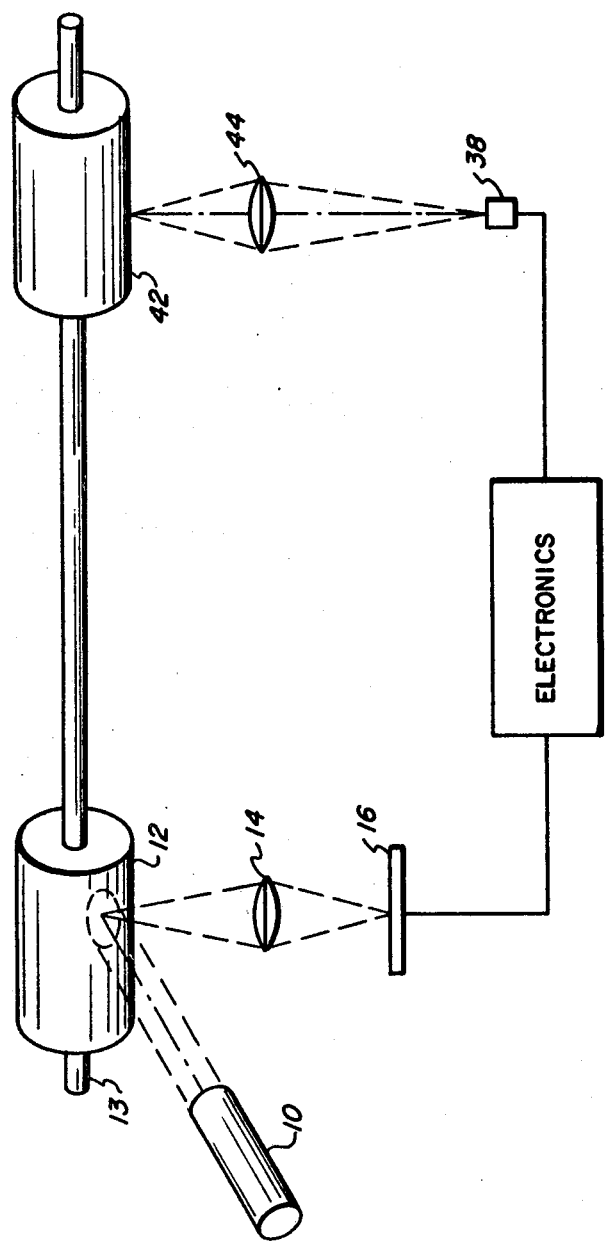
FIG. 5 is a schematic illustration of common-shaft-mounting of the read and write scanning for real time reproduction.

The logic control for the complete reproduction system can be either hardware or firmware circuitry or soft-ware programing of a computer. FIG. 2 is a schematic flow diagram illustration of the overall logic operation. The top of FIG. 3 shows a schematic illustration of a more complete electronic circuit version of FIG. 2. FIG. 3 schematically illustrates a commercially available micro-processor suitable for use in providing logic control for the system by way of a computer together with hardware and addition circuit elements comprising a preferred embodiment of the invention. FIG. 5 is a schematic illustration of the common shaft-mounting of the read and write scanning. While this is preferred for real time imaging, it will be appreciated that read and write scanning need not occur on a common shaft, but can be synchronized in any other suitable manner. Further, the output could be a recordation of values to be used later in generating the halftone reproduction. Magnetic recording is suitable for this purpose.

Referring momentarily to FIG. 5, there is seen a schematic block diagram of an electronic halftone image reproduction system according to the invention. A read scanner 10 sequentially illuminates an original image which is attached to the periphery of drum 12 which rotates about shaft 13. The original image may be a transparency as well as an opaque document and the intensity levels obtained by scanner 10 can represent either transmission intensity or reflection intensity, as appropriate. Scanner 10 operates at speeds of a millisecond or less per partial dot time period covered, though the actual speeds will depend upon the characteristics of the particular optical and electronic components used in any embodiment of the invention. Each partial dot time period of the original image, illuminated by scanner 10, is sequentially imaged by imaging lens 14 onto a light sensitive element 16 such as, for example, a photodiode. The various intensities of light striking the light sensitive element 16 are dependent upon the densities of the tone in the original image. The light is transduced by photodiode 16 into analog electronic signals. The analog electronic signal from photodiode 16 is then processed in either analog or digital format, as desired. Intentionally overlooking the electronic circuitry of FIG. 3, which will be discussed later, the output signal from the electronics is used to control the operation of a write scanner. The write scanner can comprise any scanner suitable for the imaging member to be utilized in forming the halftone reproduction of the original document to be reproduced. In FIG. 5, the imaging member 42 is a photoreceptor. Thus, a light emitting diode 38 is utilized. The output signal from the electronics will cause the light emitting diode 38 to either turn on or to remain off. If light emitting diode 38 is turned on, then the light emitted therefrom is focused by lens 44 upon photoreceptor 42. The photoreceptor 42 may be any suitable light sensitive recording medium such as a photographic film or a charged xerographic member. In a preferred embodiment, as illustrated, the photoreceptor comprises a charged xerographic drum which rotates about shaft 13 and is matched to the movement of drum 12 which carries the original image. Alternatively, photoreceptor 42 could be moved by another scanner, similar to 10 and matched to it. This sequence occurs for each partial dot time period of the running system until the terminal margin of the reproduced image is reached. At this point in time, the next line of scan is initiated. When all scan lines of the rectangular matrix are used, then the light shaft parameter is applied. It will also be appreciated that drums 12 and 42 can be moved relative to the read and write scanners; or, the read and write scanners can be moved relative to rotating drums 12 and 42.

Referring now to FIGS. 2 and 3, there is seen respectively schematic illustrations of the logic flow and system control circuitry. In each of these figures, the following notations have the meanings indicated in the legend below.

LEGEND

A. For Figures 2 and 3

NXC — the number of partial-dot positions in the "X" direction within the rectangularly arrayed screen function NLEV — the total number of partial-dot positions in the halftone cell screen function NSHIFT — the shifting parameter "s" (previously described)

NPL — the number of "pixels" (area of original scanned within one partial-dot time period) in the input scan line (pixel area = partial-dot position area)

NLP — the number of lines in the original document

CI — cell identifier

B. For FIG. 2

CELLTOTAL — an address "one" past end of cells, equals the value of "NLEV + 1"

CELLBEG — equals CELLTOTAL for first address of cell; value changes after first entry of cell values SHP — the current shift parameter; equals NXC —NSHIFT for first address of cell; thereafter, CELLA — current address in cell (contents of which are supplied to the comparator)

CELLEND — current address of the end of the block of address of the cell presently being indexed. At start = NXC KXP — current pointer to the corresponding pixel position in the input array; for determination of scan line completion NL — current line number The logic of FIGS. 2 and 3 is such that it expects as input into the program information about a halftone cell consisting of three distinct parts. A typical example is shown below and corresponds to a 32 element or partial dot halftone cell angled at 45 degrees from the vertical and which stimulates the photographic case in which the halftone cell grows from the center of the halftone cell outward towards the periphery of the cell. The first part contains the control information of this halftone cell and is: NLEV (32), NXC (8) and NSHIFT (4). The second part contains arrangements of partial dots and are:

| 32 | 27 | 11 | 2  | 1  | 6  | 18 | 30 | Rectangular array of     |
|----|----|----|----|----|----|----|----|--------------------------|
| 28 | 24 | 15 | 13 | 5  | 9  | 22 | 20 | 32 partial-dot positions |
| 8  | 16 | 14 | 21 | 25 | 17 | 23 | 12 |                          |
| 4  | 2  | 10 | 26 | 29 | 31 | 19 | 7  |                          |

The third distinct part contains specific level values in increasing order; and, for this example are

| 4   | 12  | 20  | 28  | 36  | 44  | 52  | 60  | Intensity values to be    |
|-----|-----|-----|-----|-----|-----|-----|-----|---------------------------|
| 68  | 76  | 84  | 92  | 100 | 108 | 116 | 124 | inserted in the halftone  |
| 131 | 139 | 147 | 155 | 163 | 171 | 179 | 187 | cell of 32 partial-dot    |
| 195 | 203 | 211 | 219 | 227 | 235 | 243 | 251 | positions                 |

The numbers in the rectangular array give the order in which each partial dot in the halftone cell is switched to the other bilevel state. For example, in a uniform grey area, if three of the halftone cell partial-dots should be black in the halftone cell then the halftone positions numbered 1, 2 and 3 should all be one of the two halftone levels (black or white) and all of the other cell elements the other halftone level.

It is also possible to blacken multiple elements in the halftone cell arrangements and that numerous arrangements could be created to produce different effects and halftone dot shapes.

The logic of FIGS. 2 and 3 compares one image level with one of the elements of the halftone cell (a partial dot) and makes a binary decision. The levels to be inserted into the halftone cell can stretch across the full range of allowed values of the incoming signal. It is convenient and versatile to separate the arrangement of the halftone cell from the actual selection of the level value which will be used in the decision to blacken that element of the halftone dot. In the example cited above it is assumed that the incoming intensity signal covers a range of 256 different intensity values (0–255). Digitally, this corresponds to 1 bytes of information or 8 bits. In an analog mode this corresponds to 256 resolvable voltage levels. It should be obvious from the discussion below that 256 levels are not a necessity of the logic and that a smaller or larger range of grey levels can be used and selected to enhance the output image and/or lower hardware implementation cost. The logic requires only that the levels span the range of values expected from the scanned image. While the logic still works if the incoming signal and the halftone cells don't cover comparable values, the output image could be degraded.

In the example cited above, the actual levels have been selected as 32 uniformly spaced levels from 0 to 255 starting initially at a half step interval and listed successively from low values to high values.

Before the logic starts comparing partial-dot values with incoming picture values it replaces the actual level values into the halftone cell elements. This is accomplished by taking the position labeled by a 1 in the halftone cell arrangement and putting the first (or lowest) level into that element of the cell. This process is continued until all of the halftone cell elements have been filled. In the typical example cited above the halftone cell using 32 uniform spaces out of a possible 256 different values would look like the following

| 251 | 211 | 84  | 20  | 4   | 44  | 139 | 235 |
|-----|-----|-----|-----|-----|-----|-----|-----|
| 219 | 187 | 116 | 100 | 36  | 68  | 171 | 155 |
| 60  | 124 | 108 | 163 | 195 | 131 | 179 | 92  |
| 28  | 12  | 76  | 203 | 227 | 243 | 147 | 52  |

The separation of the arrangement of the elements of the halftone cell from the level values inserted into it has at least two interesting advantages: (1) the same halftone cell arrangement can be used with a different set of levels to compensate for scanner problems; and (2) this technique can also be used to help normalize the output from various scanners and especially so when the images are stored.

The logic to generate a halftone cell at some screen angle is independent of the order in which the elements of the halftone cell are arranged or on what level values are substituted into the halftone cell. The angle of the screen and the high speed halftoning is accomplished by the three numbers in the control information part of the halftone. It can be seen that these three numbers control the overall shape of the halftone cell but not the arrangements of the elements within the cell. These three parameters are all that must be stored besides the number of elements in a halftone cell in order to create a halftone at a variable angle.

The first of these parameters is the total number of levels, or elements, or partial dot positions, in the halftone (e.g. 32 in the example above). The second parameter states the number of vertical rows in the halftone cell (i.e. 4 in the above example), and the third parameter is a shifting parameter which allows the generation of an angled screen by indexing through a rectangular array representing elements of the halftone cell (e.g. the 8 by 4 array of values in the above example).

The logic allows almost any halftone screen which is rotated to some angle to be created by using a small rectangular array of values equal in number to the elements in a halftone cell and by indexing through this array to get neighboring halftone cells by using a shift parameter. The shift parameter, the total number of elements in the halftone cell and the arrangement of the dimensions of this rectangular array can be calculated from a description of the halftone cell in the manner described earlier.

Referring now to FIG. 2 which schematically illustrates a flow chart for logic suitable for use in the practice of the present invention, we begin at the "start" where the current line number, NL, is equal to 0. Upon activation, the logic advances to the first line number and determines that the current line number is not greater than the number of lines in the picture, NLP. Accordingly, the beginning address of the cell, CELL-BEG, is set at the first partial dot position within the rectangular matrix of partial-dot positions, the current address of the end of the block of address of the cell being indexed is set equal to the number of partial-dot positions in the X direction of the rectangular matrix of partial-dot positions, and the current shift to parameter SHP, is set equal to the number of partial-dot positions in the X direction of the rectangular matrix, NXC, less the shifting parameter, NSHIFT. The logic then determines whether the current shifting parameter is greater than the total number of partial-dot positions in the X direction of the rectangular array. If it is, it is then decreased by the total number of partial-dots in the X direction. For the first scan line, the current shifting parameter will be equal to the number of partial dots in the X direction of the rectangular matrix and the current shift parameter will be adjusted to zero. However, as seen from FIG. 2, in either case, the current address in the rectangular array, CELLA, is the partial-dot position located by adding the current shifting parameter to the beginning address of the cell and the contents of this partial-dot position is outputted since the current pointer to the corresponding pixel position in the input array, KXP, is less than or equal to the number of pixels in the input scan line, NPL. The output of the contents of the partial-dot position causes the current address in the rectangular array, CELLA, to advance to the next partial-dot position in the rectangular array and the contents of this next position is outputted upon receipt of a pixel burst pulse. If the current cell address (CELLA) gets larger than CELLBEG + NXC (CELLEND), it is reset back to CELLBEG. This outputting of contents of partial-dot positions within the rectangular matrix continues until the current pointer to the corresponding pixels position in the input array is at the end of the first scan line. At this point, KXP is greater than NPL and the cycle is repeated for the next scan line. If the rectangular matrix of partial dot positions involves more than a single line, the logic operates on each line, in turn, during scanning of the original. Thus, if there are two lines in the rectangular array of partial dot positions, during the scanning of the first line of the original document, the logic operates on the first line of the rectangular matrix; during scanning of the second line of the original document, the logic operates on the second line of the rectangular matrix of partial-dot positions; during scanning of the third line of the original document, the logic once again operates upon the first line in the rectangular array of partial-dot positions beginning at an address index by the shifting parameter. Thus, the cycles are repeated until the current line number being scanned is greater than the number of scan lines in the original document, at which time the process is halted. As seen from FIG. 2, the logic takes care of the successive lines in the rectangular matrix as the scanning of the original occurs because at the end of one scan line, the beginning address of the rectangular matrix is advanced by the number of partial-dot positions in the X direction in the rectangular array.

Referring now to FIG. 3, like numerals refer to like components depicted in FIG. 5 previously discussed. As can be seen from FIG. 3, the amount of memory required by the practice of the present invention is quite small. The invention can be successfully practiced with a relatively inexpensive microprocessor available for Motorola Corporation, under Model No. MEK6800D2. This microprocessor comprises only two circuit boards: one being a keyboard and display module and the other being a microcomputer module having a 1K PROM storage. The bus between the keyboard/display module and the microcomputer module is a straightforward connection and the only one provided by the microprocessor construction. There are two ports on the microcomputer module and the input/output port designated J1 in the schematic diagrams presently commercially supplied with the microprocessor are utilized to practice the present invention. An 8 bit output bus is connected to input/output port J1 on the microcomputer module and is connected to the 8 bit input port of a digital to analog converter, such as Model DAC-8QM, commercially available from Analog Devices Corporation. Pin 47 of the digital to analog converter 23, commercially available from Analog Devices Corporation under Item No. DAC-8QM. Pin 47 of converter 23 is electrically connected to pin 10 of comparator 24. Comparator 24 is commercially available from Analog Devices Corporation under Item No. AD351. Pin 10 is one input to comparator 24. Pin 1 of comparator 24 is utilized as the second input to that device; and, pin 7 of comparator 24 is utilized as the output of that device. The current generated by photodetector 16 and its associated voltage state is amplified by amplifier 20 which is electrically connected to pin 1. The output of comparator 24 taken from pin 7 is electrically connected to one input of AND gate 21 and a write synchronization pulse generated by the scanner electronics comprises the second input into AND gate 21.

The output of AND gate 21 is amplified by amplifier 22 and turns on light emitting diode 38. The light emitted from light emitting diode 38 is focused by lens 44 upon a pixel area of photoreceptor drum 42. The characteristics of comparator 24 are such that there is no output from pin 7 until the signal on pin 1 is equal to or exceeds the signal on pin 10. Thus, the signal on pin 1 which represents the reflection density of the original document on drum 12 must be equal to or greater than the signal on pin 10 which represents the intensity level of the partial-dot position being outputted by the microprocessor, before there is an output from pin 7. This occurs at the digitizing rate set by the scanner electronic.

Figure 4:
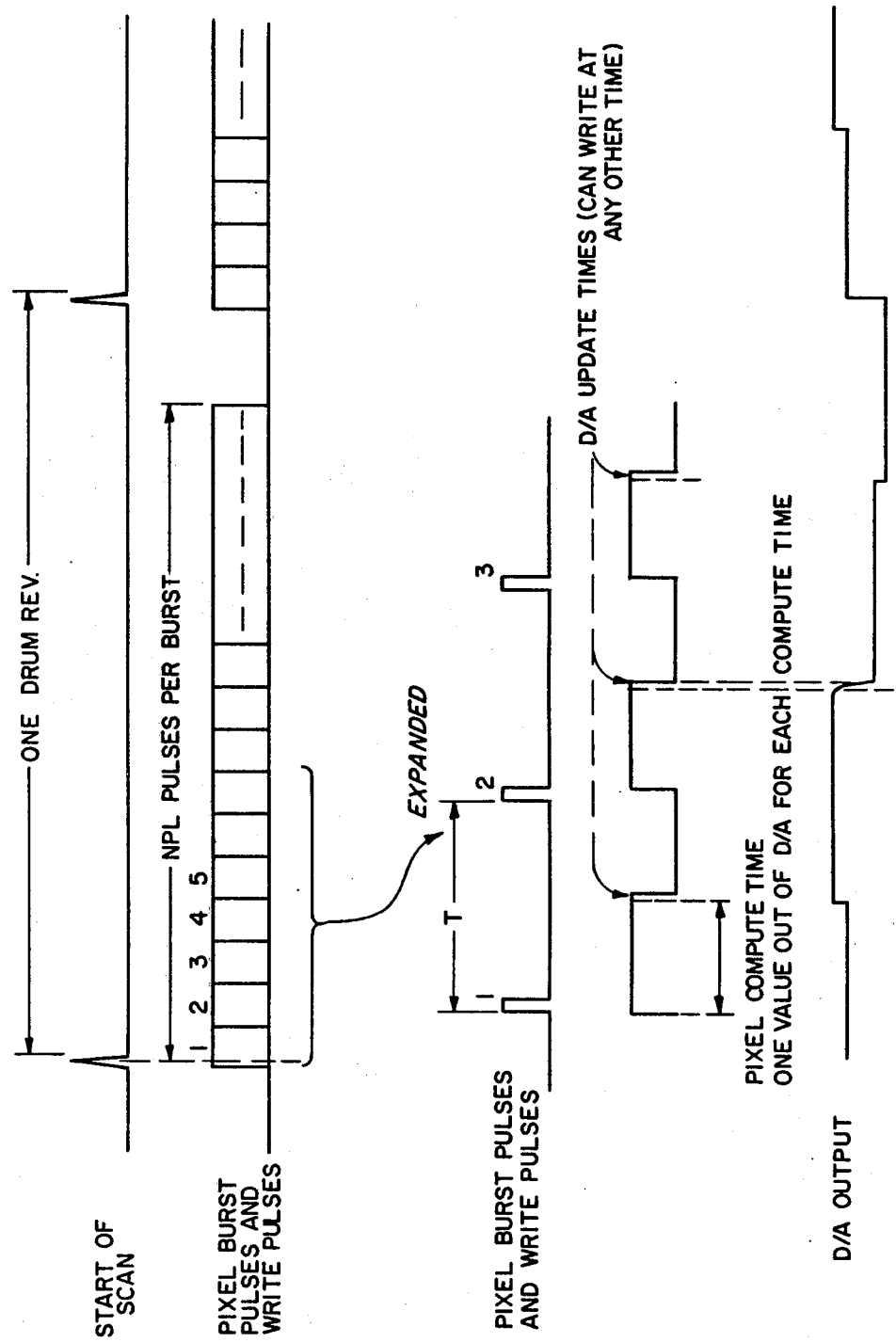
FIG. 4 is a schematic timing diagram of the system of FIG. 3.

Virtually all commercially available scanners have associated electronics built in which provide synchronization signals for synchronizing the reproducing or write scanner with the read scanner. Such a signal from the scanner electronics can be employed to provide both pixel burst pulses which output the contents of the partial dot position currently addressed by the microprocessor as well as to provide write synchronization pulses to the second input of AND gate 21. In this regard, the pixel burst pulse electrical connection and the write pulse electrical connection are connected to a common point within the scanner electronics wherever the scanner synchronization signal is found. The pixel burst pulses and the write pulses are of the same frequency and can be in phase or out of phase with the write pulses lagging the pixel burst pulses. As can be seen from FIG. 4, the write pulses can be in any phased relation to the pixel burst pulses except for that which would place the write pulses at the digital to analog converter update times. The microprocessor depicted in FIG. 3 requires only about 90 micro-seconds to cycle through each partial-dot position in its storage, and, accordingly, the rate of read and write scans are adjusted to accommodate this time period.

In operation, the user enters three values: the total number of scan lines in the original document, NLP; the total number of pixels or areas equal to the partial-dot area per scan line, NPL; and, an identification for the rectangular array of partial-dot positions to be utilized. It should be noted at this point that the microprocessor has storage capability sufficient to store several rectangular array patterns of partial-dot positions, each array representing a different angled halftone cell function, and that, therefore, identification for the halftone cell desired, CI, is utilized.

Once the user enters these three parameters into the microprocessor, the microprocessor operates on the identified halftone cell in accordance with the logic flow of FIG. 2. The binary output at the J1 port is converted by the digital to analog converter 23 into an analog voltage signal appearing at pins 47 of converter 23 and pin 10 of comparator 24. This signal represents the value contents of the partial-dot position being addressed by the microprocessor. The voltage level appearing on pin 1 of comparator 24 represents the light intensity with the pixel area being scanned by photodetector 16. When the voltage level on pin 1 is less than that representing the contents of the partial-dot value addressed by the microprocessor, there is no output from pin 7 of comparator 24 and consequently light emitting diode 38 remains cut-off. When the voltage level at pin 1 is equal to or greater than the voltage level at pin 10 the output at pin 7 is gated through AND gate 21 when a write pulse is also present at the second input to AND gate 21. This causes light emitting diode 38 to turn on; its light being focused by lens 44 upon photoreceptor 42.

Operationally, it will be appreciated that scanning read photodetector 16 constitutes means for providing a first electronic signal representing the density of the scanned original image; the program microprocessor constitutes means for providing an indexed second electronic signal representing a halftone cell screen function comprising a rectangular array of partial-dot values indexed under the supervision of a shifting parameter to cause replication of the rectangular array of partial-dot values into a pattern representing a screen function of halftone cells approximating a parallelogram and of pre-determined angularity defined by the shifting parameter; digital to analog converter 23 and comparator 24 constituting means for comparing the first electronic signal with the index second electronic signal to provide a control signal; and gate 21, amplifier 22, light emitting diode 38, lens 44 and photoreceptor 42 constituting means for printing partial-dots upon a surface in response to the control signal to create a halftone reproduction of the original document having halftone cells at the predetermined angularity and approximating a parallelogram in shape.

It will be appreciated, of course, that the program microprocessor can be easily substituted for by an electrical or electronic circuit of any type commonly referred to as hardwire or firmware. The function performed by either of these methods is equivalent for purposes of practicing the present invention.

It will become apparent to one skilled in the art upon a reading of the present disclosure that modifications and variations other than expressly described herein can be employed in the practice of the present invention.

These are intended to be included within the scope of the present invention.

For example, the imaging member technique or system used in producing the halftone reproduction is not limited to photoreceptors, xerography or copiers. Other systems and technologies applicable to displays and printers can be employed which will take, or can be modified to accept binary information.

Furthermore, it will be appreciated that the circuitry of FIG. 3 can be appropriately modified so that comparison can be done digitally rather than the analog comparison depicted.

As an example of a typical suitable program for a general purpose computer when such is used to practice the present invention, set forth below is a program which is in METASYMBOL, a computer language commonly known in the programming art and suitable for use in a sixteen bit per byte computer.

```
Z        EQU      0
P        EQU      1
L        EQU      2
T        EQU      3
X        EQU      4
B        EQU      5
E        EQU      6
A        EQU      7
MIOEX    CNAME    200
READ     CNAME    201
WRITE    CNAME    202
CTRL     CNAME    203
TERM     CNAME    205
ASSIGN   CNAME    219
         PROC
         DO       AFNUM>0
         LDX      AF(1)
         FIN
         RCPYI    P,L
         B        *AF(0)
         PEND
X8000    EQU      9
X4000    EQU      10
X2000    EQU      11
X1000    EQU      12
X800     EQU      13
X400     EQU      14
X200     EQU      15
X100     EQU      16
X80      EQU      17
X40      EQU      18
X20      EQU      19
X10      EQU      20
X8       EQU      21
X4       EQU      22
X2       EQU      23
X1       EQU      24
X0       EQU      25
X3       EQU      28
X5       EQU      31
X6       EQU      33
X7       EQU      35
X9       EQU      38
XA       EQU      40
XF       EQU      50
XF0      EQU      60
LCH      EQU      56
RCH      EQU      57
X7FFF    EQU      53
X7F      EQU      63
N1       EQU      26
N2       EQU      27
N3       EQU      29
N4       EQU      30
```

```
N5      EQU     32
N6      EQU     34
N15     EQU     51
XF7     EQU     247
CEND    CP      XA
        BNO     $+3
        SUB     X10
        ADD     X100
        ADD     ENDS+9
        STA     ENDS+9
        WRITE   ENDS
        LDA     BUFFER
        ADD     BUFMAX
        SUB     CPWD
        BAZ     WRIOC
        RCPYI   *A,X
        ADD     CPWD
        RCPY    A,B
        LDA     X0
        STA     0,1,1
        BIX     $-1
        LDA     RB
        BAN     WRIOC
        LDA     BUFMAX
        RCPYI   *A,X
        ADD     BUFFER
        RCPY    A,B
        LDA     0,1,1
        REOR    *Z,A
        STA     0,1,1
        BIX     $-3
WRIOC   WRITE   IOC
        LDA     BUFFER-2
        ADD     X2000
        STA     BUFFER-2
        WRITE   IOCD
        BAZ     $+2
        BAN     $-4
        LDA     BUFFER-2
        ADD     X2
        STA     BUFFER-2
        WRITE   IOCD
        BAZ     $+2
        BAN     $-4
        TERM
ENDS    DATA    $+1,X'3005','KP',$+5,10
        TEXT    ' STOP A=00'
RDLI    READ    RNUM
        BAZ     $+3
        CP      X5
        BNC     CEND
        LDA     RETURN
        RCPY    A,L
RIF     RCPY    X,T
        RADD    *Z,B
        RCPY    B,E
        RCPYI   X,A
        AND     N2
        RADD    A,B
        SCRS    1
        RCPY    A,X
        RADD    E,X
        RCPYI   *A,E
        LDA     0,1
        AND     RCH
        STA     0,,1
        RADD    *Z,B
        LDA     0,1
        SCRS    8
        AND     RCH
        STA     0,,1
        RADD    *Z,B
        RADDI   Z,E
        RADD    *Z,X
        BEN     $-11
        RADDI   Z,B
        RCPY    T,X
        LDA     X0
        STA     0,1,1
        RCPY    L,P
FORMAT  DATA    $+1
        LDA     NBPWD
        RCPY    A,T
        RCPYI   *A,X
        RADD    A,B
        LDA     NKCPW
        STA     NWD
        LDA     SHP
        RCPY    A,E
        LDA     CELPOS
        STA     CELLA
        RCPY    Z,L
NCP     LDA     0,1,1
        CP      *CELLA,1
        BNO     AD1
        B       CHC
AD1     LDA     X0,1
        ROR     A,L
CHC     RADDI   Z,E
        BEN     $+7
        LDA     NNXC
        RCPY    A,E
        LDA     CELLBEG
        RADDI   *T,A
        RADD    *X,A
        STA     CELLA
        BIX     NCP
        LDA     CELLA
        RADD    T,A
        STA     CELLA
        RADD    T,B
        RCPYI   *T,X
        RCPY    L,A
        STA     *CPWD
        RCPY    Z,L
        IM      CPWD
        IM      NWD
        BNC     NCP
        B       THRULI
BFM     LDA     B1
        ADD     LINSTR
        STA     CPWD
        LDA     NLIB
        STA     NLI
        LDA     FORMAT
        STA     RETURN
        LDA     OPLBL+1
        RCPY    A,B
        B       FORMAT+1
IOC     DATA    $+1
        DATA    X'3004'
        DATA    'MT'
NLI     DATA    0
RETURN  DATA    0
OUTRTN  ADRL    OUTPUT
THRULI  LDA     CPWD
        ADD     LININC
        STA     CPWD
        LDA     CELPOS
        ADD     NXC
        STA     CELPOS
        LDA     CELLBEG
        ADD     NXC
        STA     CELLBEG
        CP      CELLTL
        BNO     $+11
        SUB     NLEV
        STA     CELLBEG
```

```
            LDA     SHP                 RNUM    DATA    $+1,X'3006'
            ADD     NSHIFT              OPLBL   DATA    "EB",BUF+600,302
            BAN     $+2                 BCEND   B       CEND
            SUB     NXC                 NBPWD   DATA    16
            STA     SHP             5   NNXC    DATA    -20
            ADD     NXC                 CPWD    DATA    0
            ADD     CELLBEG             NLEV    DATA    40
            STA     CELPOS              NLINE   DATA    2
            IM      NLI                 NXC     DATA    20
            BNC     RDLIJ               LINSTR  DATA    0
            LDA     WB              10  LININC  DATA    0
            BAN     CKRB                BUFMAX  DATA    0
            LDA     BUFMAX              NKCPW   DATA    0
            RCPYI   *A,X                KCPW    DATA    0
            ADD     BUFFER              CELLTL  DATA    40+16
            RCPY    A,B             15  APC     ADRL    CELL
WBLP        LDA     0,1,1               CELLBEG DATA    1+16
            BAZ     $+10                SHP     DATA    6
            CP      X2                  CELLA   DATA    0
            BNO     V1                  RL      DATA    -1
            BNC     V3                  RC      DATA    -1
            LDA     LCH             20  RA      DATA    -1
            B       $+4                 RB      DATA    -1
V1          LDA     RCH                 WB      DATA    -1
            B       $+2                 WX      DATA    -1
V3          LDA     N1                  KSO     DATA    -1
            STA     0,1,1           25  NSHIFT  DATA    6
            BIX     WBLP                NWX     DATA    96
CKRB        LDA     RB                  NWD     DATA    0
            BAN     OUTPUTCK            B1      DATA    4032
            LDA     BUFMAX              B2      DATA    0
            RCPYI   *A,X                NLIB    DATA    8064
            ADD     BUFFER          30  STOV    LDA     0,1,1
            RCPY    A,B                         STA     *CPWD,1
            LDA     0,1,1                       BIX     $-2
            REOR    *Z,A                        B       BFM
            STA     0,1,1               CELPOS  DATA    1
            BIX     $-3             35  MCELL   DATA    $+1
OUTPUTCK    LDA     OUTRTN                      ADD     NLEV
            STA     RETURN                      ADD     X2000
RDLIJ       LDA     OPLBL+1                     RCPYI   *A,X
            RCPY    A,B                         ADD     APC
            B       RDLI                        RCPY    A,B
IOCD        DATA    $+1             40          LDA     MCELL
            DATA    X'1001'                     RADDI   *X,A
            DATA    'MT'                        STA     CPWD
BUFFER      DATA    0                           LDA     MCELL
BYTES       DATA    8064                        STA     APC
OUTPUT      WRITE   IOC             45          ADD     NLEV
            BEN     CEND                        STA     OPLBL+1
            BAZ     $+3                         ADD     OPLBL+2
            CP      X6                          ADD     X10
            BNC     CEND                        STA     B1
            WRITE   IOCD                        STA     BUFFER
            BAZ     $+3             50          ADD     BUFMAX
            BAN     $-4                         STA     B2
            B       CEND                        LDA     APC
            LDA     B2                          ADD     NBPWD
            CP      BUFFER                      STA     CELLBEG
            BNC     $+2             55          STA     CELPOS
            LDA     B1                          ADD     NLEV
            STA     BUFFER                      STA     CELLTL
            LDA     LININC                      LDA     NXC
            BAZ     BGB                         RCPYI   *A,A
            LDA     RB              60          STA     SHP
            BAN     BGB                         STA     NNXC
            LDA     BUFMAX                      B       STOV
            RCPYI   *A,X                AR1F    B       R1F
            ADD     BUFFER              LI      DATA    'LT'
            RCPY    A,B                 APL     DATA    0
            LDA     X0              65  CKCL    RADDI   *X,B
            STA     0,1,1                       RCPYI   *X,A
            BIX     $-1                         STA     B2
BGB         LDA     BUFFER                      LDA     X7F80
            B       BFM+1                       RCPY    Z,E
```

|       |       |         |    |       |          |
|-------|-------|---------|----|-------|----------|
|       | DIV   | B2      |    | BNO   | BCEND    |
|       | RCPY  | A,T     |    | RCPYI | P,L      |
|       | SARS  | 1       |    | B     | AR1F     |
|       | LDM   | X7F,,,E,1 |  | RCPY  | X,A      |
|       | RADDI | *A,E    | 5  | STA   | OPLBL+2  |
|       | RADD  | T,E     |    | ADD   | XF       |
|       | RCPY  | E,A     |    | SARS  | 4        |
|       | SARS  | 7       |    | STA   | KCPW     |
|       | STA   | 0,1,1   |    | RADD  | X,B      |
|       | BIX   | $-4     |    | LDA   | X2000    |
|       | LDA   | X0      | 10 | RADD  | A,B      |
|       | STA   | 0,,1    |    | RCPYI | *A,X     |
| CKSH  | LDA   | RA      |    | LDA   | X0       |
|       | BAZ   | $+3     |    | STA   | 0,1,1    |
|       | LDA   | NSHIFT  |    | BIX   | $-1      |
|       | B     | $+4     | 15 | LDA   | WB       |
|       | LDA   | NXC     |    | BAN   | CKWX     |
|       | SUB   | NSHIFT  |    | LDA   | N1       |
|       | STA   | NSHIFT  |    | STA   | NLIB     |
|       | BAN   | STOPS   |    | LDA   | X2       |
|       | CP    | NXC     | 20 | STA   | NBPWD    |
|       | BNO   | $+2     |    | LDA   | X0       |
|       | BNC   | STOPS   |    | STA   | LINSTR   |
|       | LDA   | RC      |    | STA   | LININC   |
|       | BAZ   | CLLV    |    | LDA   | KCPW     |
|       | LDA   | RA      |    | SALS  | 3        |
|       | BAN   | CLLV    | 25 | RCPYI | *A,A     |
|       | LDA   | NLINE   |    | STA   | NKCPW    |
|       | RCPYI | *A,T    |    | RCPYI | *A,A     |
|       | LDA   | NLEV    | CKWBA | STA | BUFMAX   |
|       | RADDI | A,A     |    | RADD  | A,A      |
|       | ADD   | APC     | 30 | STA   | BYTES    |
|       | RCPY  | A,X     |    | B     | MCELL+1  |
|       | LDA   | NXC     | CKWX | LDA | WX       |
|       | RCPYI | *A,E    |    | BAZ   | $+3      |
|       | SUB   | X1      |    | LDA   | KCPW     |
|       | ADD   | APC     |    | STA   | NWX      |
|       | RCPY  | A,L     | 35 | LDA   | NWX      |
| INVERT| RCPY  | L,B     |    | SUB   | KCPW     |
|       | LDA   | 0,,1    |    | BAN   | TOOLG    |
|       | STA   | 0,1     |    | BAZ   | SAME     |
|       | BIX   | $+1     |    | STA   | LININC   |
|       | RADD  | *Z,B    | 40 | SARS  | 1        |
|       | RADDI | Z,E     |    | STA   | LINSTR   |
|       | BEN   | $-5     | CKWXA | LDA | KCPW     |
|       | LDA   | NXC     |    | RCPYI | *A,A     |
|       | RCPYI | *A,E    |    | STA   | NKCPW    |
|       | RADD  | A,L     |    | RCPY  | Z,E      |
|       | RADDI | Z,T     | 45 | LDA   | B1       |
|       | RCPY  | T,A     |    | DIV   | NWX      |
|       | BAN   | INVERT  |    | RCPYI | *A,A     |
|       | RCPY  | X,A     |    | STA   | NLIB     |
|       | SUB   | NLEV    |    | RCPYI | *A,A     |
|       | STA   | APC     | 50 | RCPY  | Z,E      |
| CLLV  | LDA   | NLEV    |    | MUL   | NWX      |
|       | RCPYI | *A,E    |    | B     | CKWBA    |
|       | LDA   | APC     | TOOLG | LDA | NWX      |
|       | RCPY  | A,B     |    | STA   | KCPW     |
|       | LDX   | 0,,1    |    | SALS  | 4        |
|       | RADD  | *Z,X    | 55 | STA   | OPLBL+2  |
|       | LDA   | *APL,1  | SAME | LDA  | X0       |
|       | STA   | 0,,1    |    | STA   | LINSTR   |
|       | RADDI | Z,B     |    | STA   | LININC   |
|       | RADDI | Z,E     |    | B     | CKWXA    |
|       | BEN   | $-6     | 60 CKRL | LDA | NLEV     |
|       | RCPY  | B,A     |    | RCPYI | *A,A     |
|       | STA   | OPLBL+1 |    | STA   | NWD      |
|       | LDA   | LI      |    | RCPY  | A,X      |
|       | STA   | OPLBL   |    | LDA   | APC      |
|       | LDA   | X2000   |    | ADD   | NLEV     |
|       | STA   | OPLBL+2 | 65 | STA   | APL      |
|       | READ  | RNUM    |    | STA   | START    |
|       | BEN   | BCEND   |    | RCPY  | A,B      |
|       | BAZ   | $+3     |    | LDA   | RL       |
|       | CP    | X5      |    |       |          |

|       | BAN   | CKCL    |    |        | STA   | OPLBL+1    |
|-------|-------|---------|----|--------|-------|------------|
|       | LDA   | X0      |    |        | LDA   | 1,1        |
|       | B     | BEGL    |    |        | STA   | NLINE      |
| RDP   | DATA  | 0       |    |        | RCPYI | *A,A       |
| THRU  | LDA   | RC      | 5  |        | STA   | NWD        |
|       | BAN   | CKRL    |    |        | LDA   | KSO        |
|       | LDA   | N2      |    |        | BAZ   | $+3        |
| BEGL  | STA   | CKNUM   |    |        | LDA   | 2,1        |
| BEGN  | LDA   | OPLBL+1 |    |        | STA   | NSHIFT     |
|       | RCPY  | A,B     |    |        | RCPY  | Z,E        |
|       | READ  | RNUM    | 10 |        | LDA   | NLEV       |
|       | BEN   | STOPR   |    |        | DIV   | NLINE      |
|       | BAZ   | $+3     |    |        | STA   | NXC        |
|       | CP    | X5      |    |        | RCPYI | *A,A       |
|       | BNO   | STOPR   |    |        | STA   | KC         |
|       | RCPYI | P,L     | 15 |        | LDA   | RA         |
|       | B     | AR1F    |    |        | BAZ   | $+5        |
|       | RCPY  | B,A     |    |        | LDA   | X1         |
|       | STA   | B2      |    |        | STA   | NCH        |
|       | RCPY  | Z,T     |    |        | LDA   | APC        |
|       | RCPY  | X,A     | 20 |        | B     | $+5        |
|       | ADD   | N1      |    |        | LDA   | N1         |
|       | DIV   | X3      |    |        | STA   | NCH        |
|       | RCPYI | *A,A    |    |        | ADD   | APC        |
|       | STA   | LINSTR  |    |        | ADD   | NXC        |
|       | RADDI | Z,B     |    |        | STA   | START      |
| BEGA  | RCPY  | Z,L     | 25 |        | STA   | START+1    |
|       | LDA   | X3      |    |        | B     | BEGN       |
|       | RADD  | A,B     |    | STOPS  | LDA   | ERM4       |
|       | RCPYI | *A,X    |    |        | B     | ERMS       |
| BEGB  | LDA   | 0,1,1   |    | CELVAL | RCPY  | T,A        |
|       | CP    | XF0     | 30 |        | BAZ   | STOPC#     |
|       | BNO   | BEGC-1  |    |        | LDA   | B2         |
|       | AND   | XF      |    |        | RCPY  | A,B        |
|       | RADD  | *X,P    |    |        | RCPYI | *T,X       |
|       | B     | UNIT    |    |        | LDA   | 0,1,1      |
|       | B     | TEN     |    |        | STA   | *START     |
| HUND  | MUL   | XA      | 35 |        | LDA   | START      |
| TEN   | MUL   | XA      |    |        | ADD   | NCH        |
|       | RADD  | A,L     |    |        | STA   | START      |
|       | B     | $+5     |    |        | BIX   | $-5        |
| UNIT  | RADD  | L,A     |    |        | LDA   | KC         |
|       | STA   | *B2     |    |        | RADD  | T,A        |
|       | IM    | B2      | 40 |        | STA   | KC         |
|       | RADDI | Z,T     |    |        | BAN   | $+3        |
|       | BIX   | BEGB    |    |        | BAZ   | $+4        |
| BEGC  | IM    | LINSTR  |    |        | B     | STOPC#     |
|       | BNC   | BEGA    |    |        | LDA   | N1         |
|       | IM    | CKNUM   | 45 |        | B     | BEGL       |
|       | LDA   | CKNUM   |    |        | LDA   | NXC        |
|       | BAN   | KCT     |    |        | RCPYI | *A,A       |
|       | BAZ   | CELVAL  |    |        | STA   | KC         |
|       | LDA   | B2      |    |        | LDA   | START+1    |
|       | RCPY  | A,B     |    |        | ADD   | NXC        |
|       | RCPYI | *T,X    | 50 |        | STA   | START+1    |
|       | LDA   | 0,1,1   |    |        | STA   | START      |
|       | STA   | *START  |    |        | LDA   | N1         |
|       | IM    | START   |    |        | IM    | NWD        |
|       | BIX   | $-3     |    |        | BNC   | BEGL       |
|       | LDA   | NWD     | 55 |        | B     | CKRL       |
|       | RADD  | T,A     |    | STOPCC | LDA   | ERM1       |
|       | STA   | NWD     |    |        | B     | ERMS       |
|       | BAN   | BEGN    |    | STOPC# | LDA   | ERM2       |
|       | BAZ   | CKSH    |    |        | B     | ERMS       |
|       | B     | STOPL   | 60 | STOPL  | LDA   | ERM3       |
| X7F80 | DATA  | X'7F80' |    |        | B     | ERMS       |
| KCT   | LDX   | B2      |    | STOPR  | LDA   | ERM5       |
|       | RADDI | *T,X    |    |        | B     | ERMS       |
|       | RCPY  | T,A     |    | ERMS   | STA   | ERM        |
|       | SUB   | X3      |    |        | WRITE | ERR        |
|       | BAN   | STOPCC  | 65 | TERM   | TERM  |            |
|       | LDA   | 0,1     |    | ERR    | DATA  | $+1,X'3005','KP' |
|       | STA   | NLEV    |    | ERM    | DATA  | 0,14       |
|       | SALS  | 2       |    | START  | LDA   | X20        |
|       | RADD  | B,A     |    |        | RCPYI | *A,X       |

```
          ADD     XF7
          ADD     X2
          RCPY    A,B
          LDA     OPLBL+1
          ADD     X20
          STA     RDP
          LDA     0,1,1
          STA     *RDP,1
          BIX     $-2
          LDA     RDP
          SUB     X20
          RCPY    A,B
          LDX     X40
          RCPYI   P,L
          B       R1F
          RCPYI   *X,A
          STA     NWD
          LDX     X0
          LDA     0,,1
          CP      X40
          BNC     NBLANK
NCH       LDX     X0
RIN       RADDI   Z,B
          IM      NWD
          BNC     $-6
          B       THRU
NBLANK    CP      KC,1
          BXNC    NOT
          RADD    X,P
          B       WASW
          B       CKNUM
          B       WASR
          B       WASRG
          B       WASRG
          B       WASRG
          B       WASRG
          B       WASRG
          B       CKNUM
NOT       RADD    X,P
          B       NCH
          B       NBLANK
          B       NBLANK
          B       NCH
          B       NBLANK
          B       NBLANK
          B       NBLANK
          B       NCH
          B       NBLANK
          B       NCH
WASW      LDX     X7
          B       RTN
WASR      LDX     X3
          B       RTN
WX#       BAZ     $+2
          STA     NWX
WASRG     LDA     N3
          RADD    A,X
          IM      RL,1
          BNC     $+2
          B       NCH
          LDA     N1
          STA     RL,1
          B       NCH
KC        DATA    X'00E6',X'00E2',X'00D9',X'00D3',X'00C3',X'00C1'
          DATA    X'00C2',X'00C2',X'00E7'
CKNUM     LDA     X0
          STA     RDP
RTN#      RADDI   Z,B
          IM      NWD
          BNC     $+2
          B       THRU
          LDA     0,,1
          CP      XF0
          BNO     THRU#
```

```
              LDA       RDP
              MUL       XA
              RCPY      A,L
              LDA       0,,1
              AND       XF
              RADD      L,A
              STA       RDP
              B         RTN#
THRU#         LDA       RDP
              RADD      *Z,B
              RCPYI     *X,T
              RADDI     T,Z
              BNC       WX#
              BAZ       NCH
              STA       NSHIFT
              IM        KSO
              B         NCH
ERM1          DATA      $+1
              TEXT      ' CELL CC PROB '
ERM2          DATA      $+1
              RWZR      ' NOT NLINE VAL'
ERM3          DATA      $+1
              TEXT      ' LEVEL # ERROR'
ERM4          DATA      $+1
              TEXT      ' NSHIFT<0 OR>N'
ERM5          DATA      $+1
              TEXT      ' EOF CELL +LEV'
              LPOOL
CELL          DATA      39,31,20,12,18,28,23,11,5,1,2,10,24,29,17,13,19,30,36
              DATA      40
              DATA      33,27,9,3,6,14,21,15,7,4,8,16,32,38,35,25,22,26,34,37
BUF           EQU       $
              END       START
```

What is claimed is:

1. In an electronic halftone screening method of the type wherein sequentially generated pictorial signals are representative of a number of pixel positions in a scan line and a plurality of the scan lines define an original image and wherein synchronously generated halftone screen signals are representative of partial dot values for each pixel position in each scan line and are combined with corresponding pictorial signals to generate reproduction signals which collectively define a halftone reproduction image of the original image, the partial dot values for the screen signals being organized in cells shaped in an angled, rectangular pattern that encompasses pixels in multiple scan lines with the cell pattern being repeated to cover the area of the original image, the improvement being reducing the electronic storage required for the partial dot values and simplifying the electronic addressing operations for the stored partial dot values comprising arranging the partial dot values in an order within a number of circulating storage means with the order and number of storage means being determined by the angle of the screen, a first of said circulating storage means containing an arrangement of partial dot values for combination with a first scan line of pictorial signals and second and subsequent circulating storage means, when required by a screen angle, containing an arrangement of partial dot values for corresponding second and subsequent scan lines of pictorial signals, starting the circulation of the partial dot values within a circulating storage means at the partial dot value for the first pixel in a first scan line synchronously with generation of a pictorial signal representative of the first pixel in a first scan line and continuing the synchronous circulation throughout the scan line, continuing the like circulation of the partial dot values in a second and subsequent numbers of circulating storage means, if any, for second and subsequent scan lines as required for a particular screen angle, repeating the circulation of the partial dot values in the first and subsequent circulating storage means for scan lines not assigned a circulating storage means in the same order after shifting the start of the circulation of partial dot values by a number of partial dot values relative to the order of partial dots existing in the circulating storage means being subject to the repeated circulations, the number of shifts being determined by the angle of the screen.

2. In electronic halftone screening apparatus of the type wherein sequentially generated pictorial signals are representative of a number of pixel positions in a scan line and a plurality of the scan lines define an original image and wherein synchronously generated halftone screen signals are representative of partial dot values for each pixel position in each scan line and are combined with corresponding pictorial signals to generate reproduction signals which collectively define a halftone reproduction image of the original image, the partial dot values for the screen signals being organized in cells shaped in an angled, rectangular pattern that encompasses pixels in multiple scan lines with the cell pattern being repeated to cover the area of the original image, the improvement comprising one or more circulating storage means for storing the partial dot values of a halftone cell with the partial dot values arranged in a given order within the storage means which is determined by the angle of the screen as is the number of said storage means, the total number of said storage means being less than the number of scan lines encompassed by a halftone cell, means for starting the circulation of the partial dot values within a first storage means synchronously with the start of the pictorial signals for a first scan line and for continuing the circulation until the end of the scan line, means for starting the circulation of the partial dot values within a second and subsequent storage means, if any, synchronously with the start of the pictorial signals for a second and subsequent scan lines and for continuing the circulation until the end of the corresponding scan lines, and means for repeating the circulation of the partial dot values in the first and any subsequent circulating storage means after the circulation is completed in the last circulating storage means and means for shifting the start of the repeat circulations within the storage means a number of partial dot values relative to the order of the partial dots in the previous circulation in a storage means, the number of shifts being determined by the angle of the screen.

* * * * *